US011431704B2

(12) United States Patent
Mercier et al.

(10) Patent No.: US 11,431,704 B2
(45) Date of Patent: Aug. 30, 2022

(54) METHOD OF AUTHENTICATION, SERVER AND ELECTRONIC IDENTITY DEVICE (71) Applicant: Idemia Identity & Security France, Courbevoie (FR)

(72) Inventors: Laurent Mercier, Courbevoie (FR); Olivier Heurtier, Courbevoie (FR); Laurent Boni, Courbevoie (FR); Laurent Kerautret, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 332 days.

(21) Appl. No.: 16/725,496

(22) Filed: Dec. 23, 2019

(65) Prior Publication Data

US 2020/0252395 A1 Aug. 6, 2020

(30) Foreign Application Priority Data

Feb. 1, 2019 (FR) ...................................... 1901001

(51) Int. Cl.
*H04L 29/06* (2006.01)
*H04L 9/40* (2022.01)
*G06K 19/06* (2006.01)

(52) U.S. Cl.
CPC .... *H04L 63/0861* (2013.01); *G06K 19/06037* (2013.01); *H04L 63/0838* (2013.01)

(58) Field of Classification Search
None
See application file for complete search history.

(56) References Cited

U.S. PATENT DOCUMENTS

| 9,614,838 B1* | 4/2017 | Duchin | ................... G06F 21/35 |
| 10,185,873 B2* | 1/2019 | Rouh | ................. G06K 9/00711 |

(Continued)

FOREIGN PATENT DOCUMENTS

| EP | 3206192 A1 | 8/2017 |
| FR | 3038418 A1 | 1/2017 |
| WO | WO2016183338 A1 | 11/2016 |

OTHER PUBLICATIONS

Correspondence from the French National Institute of Industrial Property Office (INPI—Institute National De La Propriété Industrielle) for FR1901001 dated Oct. 17, 2019; Preliminary Research Report of the French National Institute of Industrial Property Office for FR1901001 dated Oct. 14, 2019; and Written Opinion on the Patentability of the Invention issued by the French National Institute of Industrial Property Office for FR1901001.

*Primary Examiner* — Piotr Poltorak
(74) *Attorney, Agent, or Firm* — Womble Bond Dickinson (US) LLP (57) ABSTRACT

The invention proposes a method of authentication of an electronic identity device (1) presented by an individual, the method being characterized in that it comprises the implementation of steps of:
(b) Reception by data processing means (21) of a server (2) of an acquired image of said electronic identity device (1), the image representing at least one personal visual element of the individual and a dynamic verification code that are visible on said electronic identity device (1), said dynamic verification code containing at least one item of reference information representative of an expected appearance of said visual element;
(c) Extraction, by analysis of said acquired image by the data processing means (21) of the server (2), of:
an item of candidate information representative of the appearance of said visual element as represented in the acquired image;

(Continued)

the reference information representative of the expected appearance of said visual element contained in said dynamic verification code as represented in the acquired image;

(d) Verification by the data processing means (21) of the server (2) that the extracted candidate information and reference information match.

The invention also relates to a server and an electronic identity device for that purpose.

15 Claims, 6 Drawing Sheets

(56) References Cited

U.S. PATENT DOCUMENTS

| | | | |
|---|---|---|---|
| 10,580,003 B2* | 3/2020 | Gouessant | G06K 19/06037 |
| 2003/0041244 A1* | 2/2003 | Buttyan | H04L 9/3273 |
| | | | 713/172 |
| 2009/0235339 A1* | 9/2009 | Mennes | G06F 21/34 |
| | | | 726/5 |
| 2014/0050398 A1* | 2/2014 | Pashintsev | G06K 9/3216 |
| | | | 382/167 |
| 2014/0270400 A1* | 9/2014 | Natale | G06Q 10/02 |
| | | | 382/115 |
| 2016/0183032 A1* | 6/2016 | Pogorelik | H04W 12/04 |
| | | | 455/41.1 |
| 2017/0236355 A1 | 8/2017 | Chabanne et al. | |
| 2018/0082050 A1* | 3/2018 | Flink | G06F 11/3438 |
| 2018/0205556 A1* | 7/2018 | Rieul | G06K 7/1417 |
| 2019/0268158 A1* | 8/2019 | Lentini | G06K 19/06037 |

\* cited by examiner

METHOD OF AUTHENTICATION, SERVER AND ELECTRONIC IDENTITY DEVICE

CROSS-REFERENCE TO RELATED APPLICATIONS

This specification is based upon and claims the benefit of priority from French patent application number FR 1901001 filed on Feb. 1, 2019, the entire contents of which are incorporated herein by reference.

TECHNICAL FIELD OF THE INVENTION

The invention relates to a method of authentication of an electronic identity device presented by an individual.

STATE OF THE ART

The possession of a valid identity document (identity card, passport, driving license, Social Security card, etc.) proves the identity of an individual before an authority.

Identity documents generally consist of a paper or plastic medium, on which a photo as well as personal alphanumeric information (surname, given name, date of birth, etc.) of the holder are printed. There is also a strip called MRZ (Machine-Readable Zone), which contains a code (generally two lines of 36 characters) summarizing the alphanumeric information of the document.

Generally, identity documents have a large number of high-level security elements such as watermarks or holograms to prevent forgery. The lifespan of such a document is generally limited (10 or 15 years), since the appearance of its holder changes progressively, and the security elements evolve.

Therefore, original identity documents are satisfactory and prove very difficult to forge perfectly, but reproducing copies poses a difficulty.

Indeed, many third parties such as hotels, banks, transportation services, etc., occasionally require a scan or a photocopy of an identity document for security purposes (for example, to retrieve a rental car).

As a result, there may be hundreds of copies of an identity document over its lifespan, which prove to be more easily falsifiable than the original since the security elements cannot be verified. There is also the possibility that some of these copies are left in accessible areas such as at a bank counter or on an unsecured server.

In other words, there is a risk that a malicious third party may retrieve a copy of your passport and modify it, putting his/her photo in place of yours and stealing your identity in order to open a bank account. And this could happen years after the photocopy was made.

It should be noted that the MRZ, which appears on the copies, only enables a faster computerized reading (which allows alphanumeric information to be extracted directly rather than retyping it by hand), but does not constitute a means of proving the validity or authenticity of the identity document. Moreover, the MRZ is as easy to falsify on a copy as the photo.

To solve these problems, electronic identity documents with built-in microprocessor been proposed. Typically, a chip-type card is used as medium, storing in its microprocessor the identity document data:
  The digitized photo;
  All or part of the alphanumeric data printed on the card;
  One or more authentication certificates (typically RSA, for electronic signature).

A reading of the chip card (optionally contactless) then advantageously replaces the need for a copy: at a bank counter, for example, instead of leaving a photocopy a person is authenticated by inserting the card into the card reader and the information is transmitted directly to the bank's information system.

Such a solution is satisfactory, but requires that a card reader be present. In addition, it cannot be implemented remotely, and it is still necessary, in this case, to send a scan (either by sending it by email or uploading it to a server).

More recently, a very clever mechanism application has been proposed in application EP3206192 for generating security data called "Digital Photo Seal" from a visual element of an identity document (in particular the photo). This security data constitutes a sort of imprint of the visual element: images acquired from the same visual element, irrespective of the conditions of acquisition (i.e. including scanning or photocopying), result in obtaining substantially identical security data. On the contrary, the slightest modification of the visual element causes a strong variation in this security element.

Therefore, the "expected" reference security data for a given document has only to be stored on a server and compared to a "candidate" generated from a copy of this document to determine whether the visual element of said document is real or not.

This solution offers significant progress in that it can be guaranteed that a copy of an identity document is authentic.

However, in some cases it is still possible to steal an identity even on the basis of an authentic copy of an identity document, due to the lack of first-hand verification. For example, a bank account can be opened online without having to show your face. An identity thief can provide an authentic copy of a third party's identity document that does not even resembles him/her. It should be noted that more and more often online authentication procedures require showing your face using a webcam or a smartphone for visual comparison against the photo from the provided copy, but this is not routinely followed.

Even in the event of such a comparison, there still is a risk the identity thief either provides a fake photo (a photo of the legitimate holder of the identity document which he/she is attempting to use, for example, found on a social network), or even misleads the person making the comparison. Indeed, verification that an individual "resembles" the photo from an identity document is subjective and subject to human error, especially if the copy provided is of poor quality (black-and-white photocopy, smartphone picture, etc.), and especially knowing that over the lifespan of an identity document the appearance of its holder can greatly vary, requiring a certain tolerance.

It would therefore be desirable to have an authentication solution that is simple, universal, reliable and completely secure for preventing any uncontrolled use of a copy of an identity document.

BRIEF DESCRIPTION OF THE INVENTION

According to a first aspect, the invention relates to a method of authenticating an electronic identity device presented by an individual, the method being characterized in that it comprises the implementation of the steps of:
  (b) Reception by data processing means of a server of an acquired image of said electronic identity device, the image representing at least one personal visual element of the individual and a dynamic verification code that are visible on said electronic identity device, said dynamic verification code containing at least one item of reference information representative of an expected appearance of said visual element;

(c) Extraction, by analysis of said image acquired by the data processing means of the server, of:
- an item of candidate information representative of the appearance of said visual element as represented in the acquired image;
- the reference information representative of the expected appearance of said visual element contained in said dynamic verification code as represented in the acquired image;

(d) Verification by the server's data processing means that the extracted candidate information and reference information match.

According to other advantageous and nonlimiting characteristics:
- The method comprises a step (a) of displaying said dynamic verification code by display means of said electronic identity device;
- step (a) comprises the preliminary generation of said dynamic verification code by data processing means of said electronic identity device based on at least said reference information representative of an expected appearance of said visual element and a one-time password (OTP);
- step (a) and step (c) each comprise the generation of said OTP, respectively by the data processing means of the electronic identity device and the data processing means of the server, based on a shared secret;
- said one-time password is a time-based one-time password (TOTP), the generation of said TOTP by the data processing means of the electronic identity device and the data processing means of the server also being based on time information;
- said dynamic verification code also contains at least one descriptive data from said OTP generated by the data processing means of the electronic identity device, step (c) also comprising the extraction of the descriptive data from said OTP contained in said dynamic verification code as represented in the acquired image, step (d) also comprising the verification that the OTP generated by the data processing means of the server matches said descriptive data of the extracted OTP;
- said dynamic verification code is displayed in the form of a QR code and/or an alphanumeric code;
- said dynamic verification code also contains an electronic signature of said reference information representative of an expected appearance of said visual element, step (c) also comprising the extraction of the electronic signature contained in said dynamic verification code as represented in the acquired image, step (d) also comprising the verification that said extracted electronic signature is valid;
- said personal visual element of the individual is printed on the electronic identity device;
- a visual element visible on said electronic identity device is either a graphical element associated with the individual, in particular a photograph of the individual, a handwritten signature of the individual a biometric sample of the individual or a representation of at least one alphanumeric attribute associated with the individual; or an alphanumeric attribute associated with the individual;
- the reference information representative of an expected appearance from said graphical element is a Digital Photo Seal type security data or a biometric template;
- the information representative of an appearance of said alphanumeric attribute being the value or a hash of said alphanumeric attribute associated with the individual.

According to a second aspect, the invention relates to an authentication server, characterized in that it comprises data processing means configured for:
Receiving an acquired image of an electronic identity device presented by an individual, the image representing at least one personal visual element of the individual and a dynamic verification code visible on said electronic identity device, said dynamic verification code containing at least one item of reference information representative of an expected appearance of said visual element;

Extracting, by analysis of said acquired image:
- an item of candidate information representative of the appearance of said visual element as represented in the acquired image;
- the reference information representative of the expected appearance of said visual element contained in said dynamic verification code as represented in the acquired image;

Verifying that the extracted candidate information and the reference information match.

According to a third aspect, the invention relates to an electronic identity device of an individual on which at least one personal visual element of said individual is visible, characterized in that it comprises data processing means configured for:
Generating and displaying on the display means a dynamic verification code containing at least one item of reference information representative of an expected appearance of said visual element.

According to other advantageous and non-limiting characteristics, the data processing means are further configured for generating preliminarily a one-time password (OTP), said dynamic verification code being generated based on at least said reference information representative of an expected appearance of said visual element and of said generated OTP.

According to a fourth aspect, the invention relates to an authentication system comprising an authentication server according to the second aspect, at least one electronic identity device according to the third aspect, and at least one client equipment comprising optical acquisition means for the acquisition of said image representing at least the personal visual element of the individual and the dynamic verification code visible on said electronic identity device.

According to the fifth and sixth aspects, the invention relates to a computer program product comprising code instructions for the execution of a method according to the first aspect of authentication of an electronic identity device presented by an individual; and storage means readable by a computer equipment on which a computer program product comprises code instructions for the execution of a method according to the first aspect of authentication of an electronic identity device presented by an individual.

DESCRIPTION OF THE FIGURES

Other characteristics, purposes and advantages of the present invention will be seen from the following detailed description, with reference to the appended figures provided by way of non-limiting examples, and in which.

DETAILED DESCRIPTION

Architecture

Figure 1:
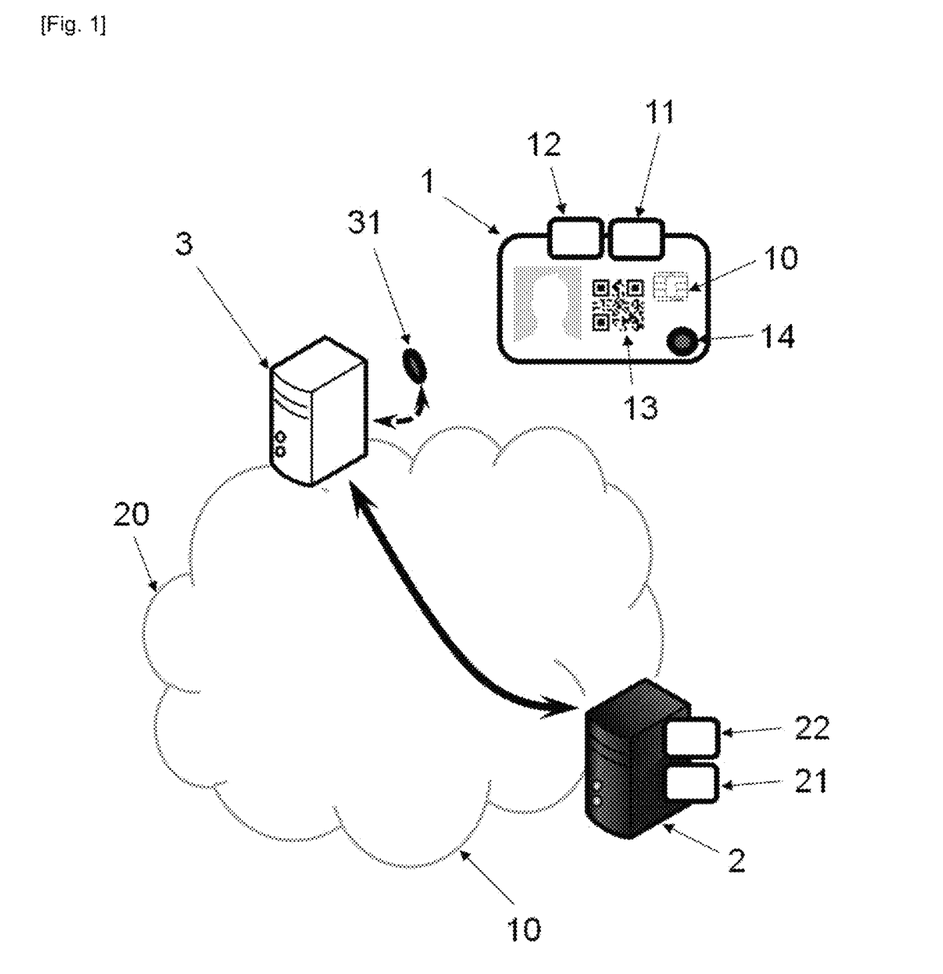
FIG. 1 schematically depicts a system for the implementation of the method according to the invention.

With reference to FIG. 1, represented schematically is an authentication system architecture for the implementation of the present method of authenticating an electronic identity device 1 presented by an individual (i.e. validation of the authenticity of said electronic identity device 1), particularly with a view to authenticating/identifying said individual on the basis of said device 1. Said system comprises at least said electronic identity device 1 and a server 2. The system can also comprise client equipment 3 connected to the server 2 via a network 20 such as Internet.

The electronic identity device 1 is a personal equipment to an individual (many individuals can each have such an electronic identity device), and constitutes an official identity document, advantageously issued by a government agency. According to a preferred embodiment, it takes the form of a chip card (or "smart card"—see FIG. 2a) of standard dimensions and generally made of PVC or polycarbonate, but it can also involve a smartphone type terminal or a touchpad terminal—see FIG. 2b.

In any case, the electronic identity device 1 includes data processing means 11, i.e. a computer such as, for example, a processor, a microprocessor, a controller, a microcontroller, an FPGA, etc. Said computer is suitable for executing code instructions in order to implement the following method. It should be noted that if the electronic identity device 1 is a chip card, the data processing means 11 can be other than the "chip" 10 (and where appropriate, in connection with the latter or completely isolated; see below), which can have a conventional function when interacting with a reader. More specifically, it is possible to start with an existing identity chip card and add the processing means 11 thereto.

Figure 3A:
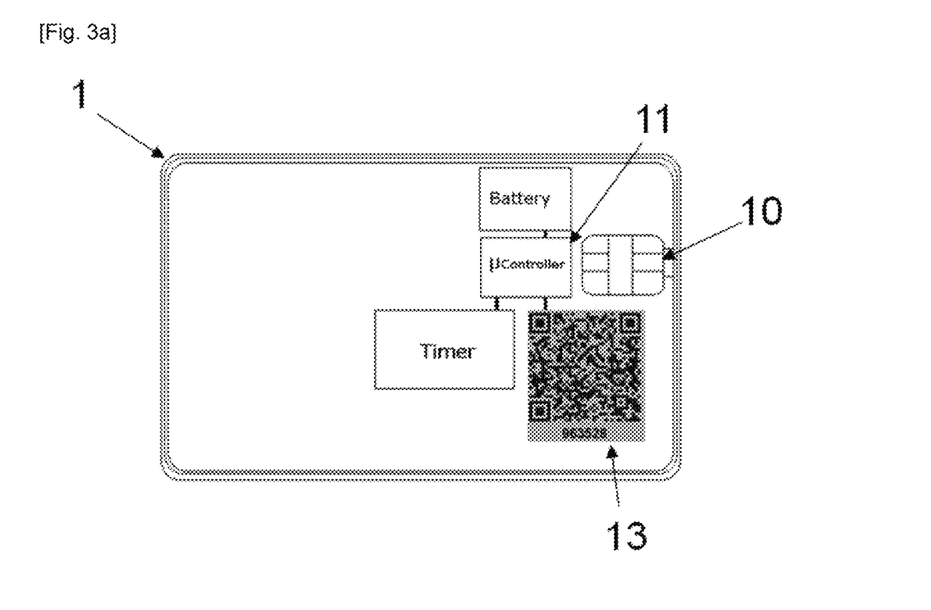
FIG. 3a schematically depicts an example of configuration of the first type of electronic identity device that can be used in the method according to the invention.
Figure 3B:
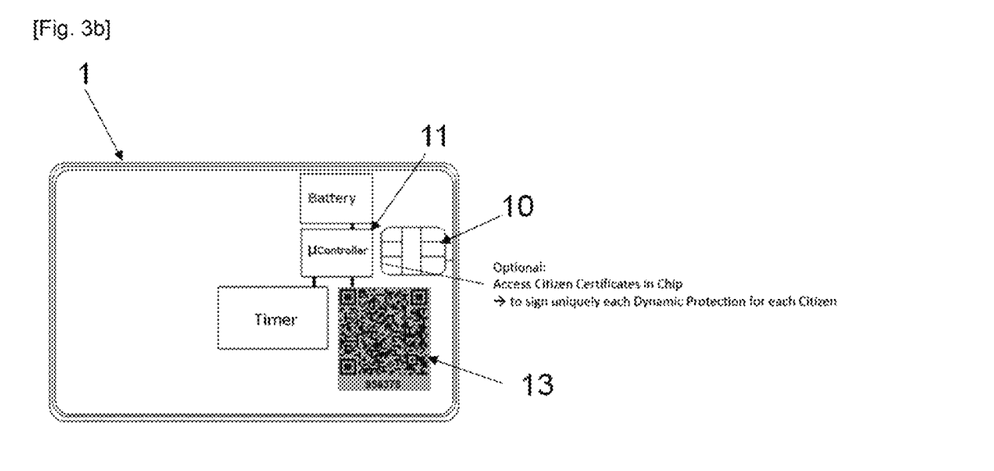
FIG. 3b schematically depicts an example of configuration of the first type of electronic identity device that can be used in the method according to the invention.
Figure 3C:
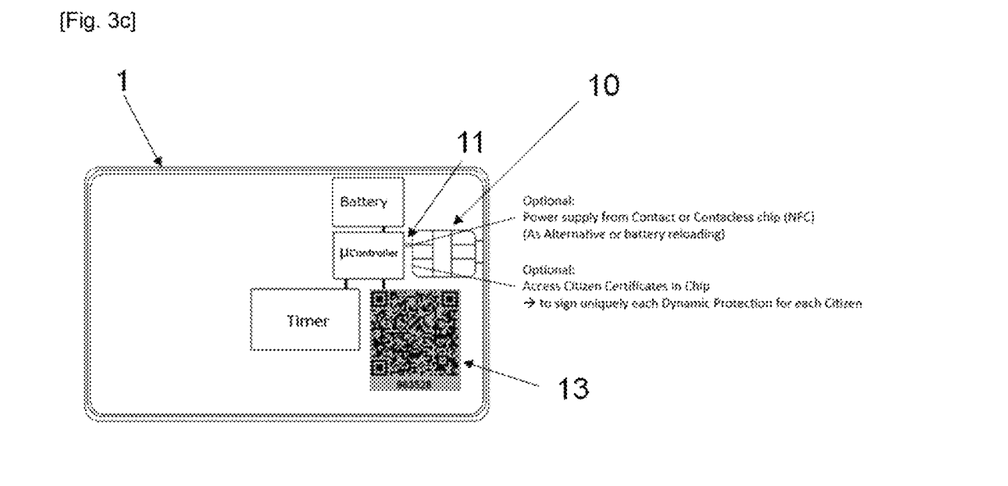
FIG. 3c schematically depicts an example of configuration of the first type of electronic identity device that can be used in the method according to the invention.
Figure 3D:
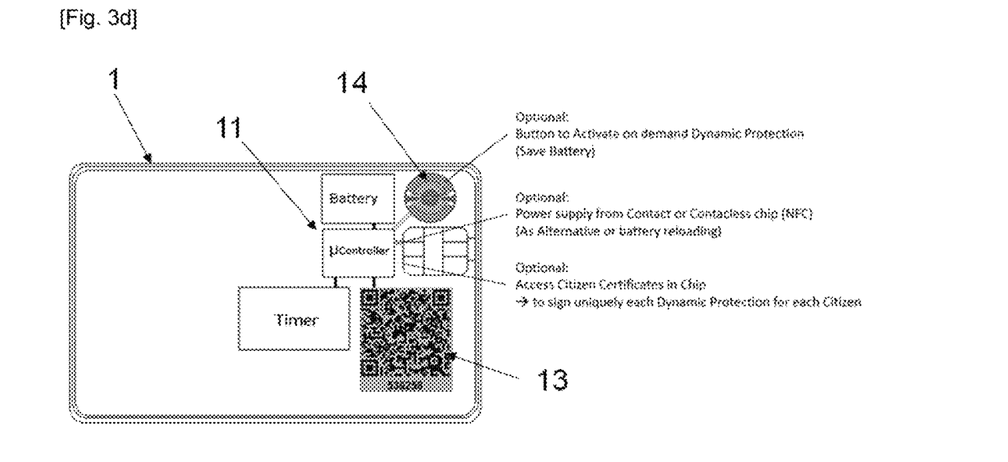
FIG. 3d schematically depicts an example of configuration of the first type of electronic identity device that can be used in the method according to the invention.

The device 1 can also comprise data storage means 12 (for example, a flash memory), display means 13 (typically a screen, especially of the electronic ink type if the device 1 is a chip card), a battery, and optionally a button 14. Various embodiments of the chip card type device 1 are depicted in FIGS. 3a-3d (their advantages and disadvantages are described in more detail hereinafter):

in FIG. 3a, the chip 10 and the data processing means 11 are completely isolated;

in FIG. 3b, the chip 10 and the data processing means 11 are connected in such a way that the data processing means 11 can access the data from the chip 10;

in FIG. 3c, the chip 10 and the data processing means 11 are electrically connected in such a way as to enable electrical supply and/or a recharge of the battery by contact (during communication with a conventional reader) or by induction (during contactless communication);

in FIG. 3d, the electronic identity device 1 comprises a button 14 connected to the means 11. In this FIG. 3d there is a dual link between the chip 10 and the data processing means 11 in FIG. 3c, but alternatively there could be a button 14 in the architectures shown in FIGS. 3a and 3d. In all these figures, the battery and the timer unit are optional.

The server 2 is a remote, secure equipment, typically belonging to an authority or a security service supplier. Again, it comprises data processing means 21 and a memory 22.

The client equipment 3 is a local terminal comprising optical acquisition means 31 suitable for acquiring an image (from the device 1, as will be seen), and if applicable transmitting it to the server 2. The client equipment 3 and the server 2 advantageously comprise communication interfaces enabling them to dialogue remotely.

It should be noted that the equipment 3 remains optional and may have numerous embodiments. More specifically, and as will be seen, it is sufficient for the implementation of the method that the server 2 be able to receive an image acquired from the electronic identity device 1 in one way or another, including indirectly:

According to a first embodiment, the client equipment 3 is directly connected to the server 2 via the network 20, and is particularly a mobile terminal such as a smartphone, a scanner, a webcam, etc., which can photograph/scan the electronic identity device 1 (or a copy thereof, in particular, a photocopy) and send the acquired image to the server via a wired network (Ethernet), wireless network (Wi-Fi) or mobile network (GPRS, 3G, 4G or other). For example, the client equipment 3 can be a scanner at a bank counter used by an employee who wishes to directly authenticate the electronic identity device 1 of an individual before him/her;

According to a second embodiment, the client equipment 3 is not directly connected to the server 2, whether it is offline or the connection is indirect. For example, it may be considered that:

The client equipment 3 again is a smartphone type mobile terminal, a scanner or a webcam, this time personal to the individual who wishes to be authenticated, which again acquires the image from the electronic identity device 1 but transfers it (for example, by email or by upload to an Internet site) to a third party (for example, a vehicle rental company, where typically the individual is required to provide his/her driving license in order to rent a vehicle over the Internet), and it is the latter that will be connected to the server 2 for the implementation of the method;

The client equipment 3 is an equipment that is not connected, such as a digital photo device, that sends the acquired image, for example, via a USB cable connection to a third-party equipment (for example a PC), which is connected directly or indirectly to the server 2;

According to a third embodiment, the client equipment 3 is combined with the electronic identity device 1, particularly if the latter is a smartphone type of mobile terminal. It is conceivable that the image of the electronic identity device 1 is acquired for example by taking a photo thereof in a mirror, or by a screen capture.

In any case, as explained, the client equipment 3 can acquire an image from the electronic identity device 1, i.e. photograph a photocopy rather than the device 1 directly, even a photocopy of a photocopy, etc. As will be seen, it will be sufficient that the acquired image represent the device 1. It will be understood that the present method is in no way limited to obtaining this image nor is it limited to any particular kind (the acquired image can be black and white, poor quality, etc.).

Principle

The present invention provides at least one personal visual element of the individual and a dynamic verification code that are visible on said electronic identity device 1, said dynamic verification code containing at least one item of reference information representative of an expected appearance of said visual element;

Personal visual element of the individual is understood either as an alphanumeric attribute associated with the individual, i.e. a string type object, generally the name and/or the surname of the individual, but in particular it may be any attribute chosen from among a list of possibilities such as:

Number of the identity document that the device 1 constitutes;
Expiration date;
Date of issue:
Surname;
Given name(s);
Nationality;
Date of birth;
Place of birth;
Sex;
Height;
Address;
etc.

or a graphical element associated to the individual, i.e. an "image" which is nor of alphanumeric nature, in other words an object constituted of pixels and not a mere string, and treat it as such. Said image may advantageously represent:

at least one photograph of the individual (as currently found on all identity documents),
at least a handwritten signature of the individual,
at least one biometric sample (also called biometric print) of the individual (for instance a fingerprint, a palmprint, an iris, etc.), and/or
at least one alphanumeric attribute associated with the individual as defined above (here it refers to the representation of the alphanumeric attribute—as an image—and not the string it encodes, i.e. there is no OCR).

It will be understood that there may be a plurality of visible personal visual elements, advantageously at least one photograph type graphical element, and that said dynamic verification code contains for each of them at least a portion (advantageously all) of said plurality of visual elements of reference information representative of an expected appearance of said personal visual element.

Besides, it is possible that a wide area of the electronic identity device 1 (covering for instance the photograph and an alphanumeric attribute, or even the whole visible surface) is considered as a single graphical element. Every combination is possible, as long as each graphical element is treated as an image.

Figure 2A:
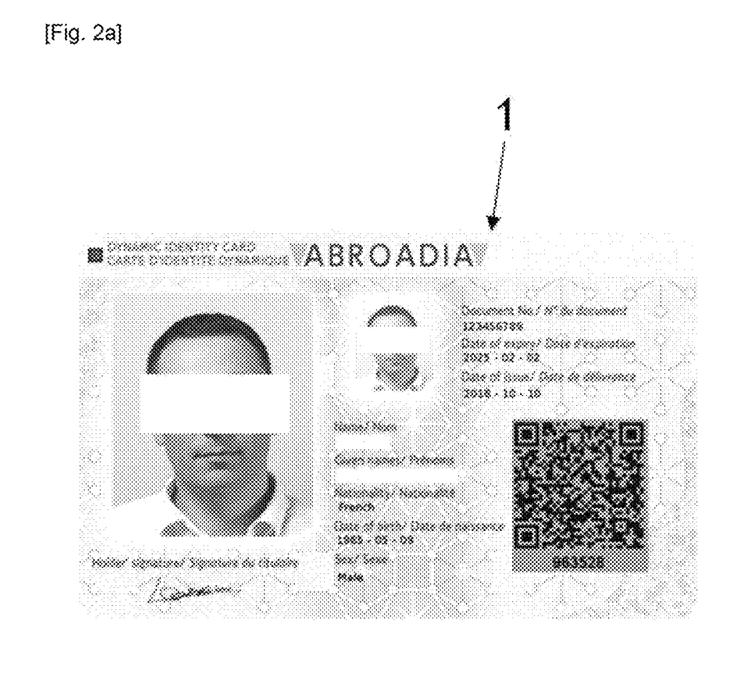
FIG. 2a depicts a type of electronic identity device (chip card) that can be used in the method according to the invention.
Figure 2B:
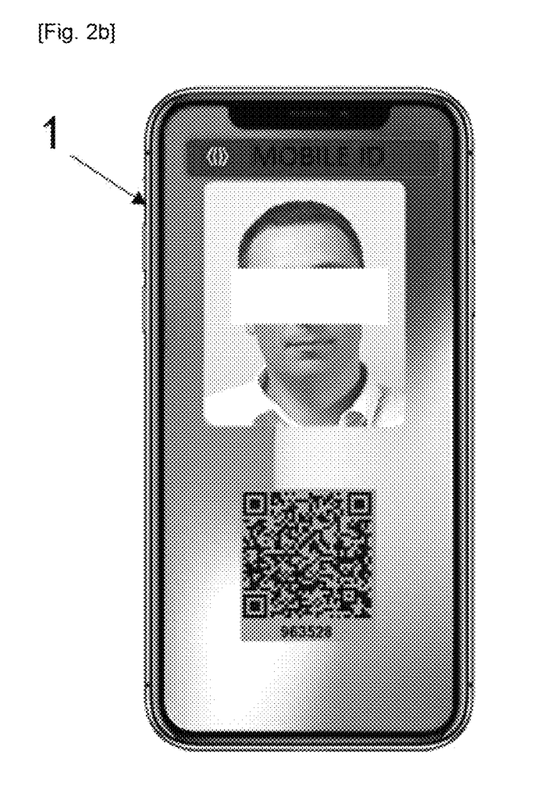
FIG. 2b depicts a type of electronic identity device (smartphone type terminal) that can be used in the method according to the invention.

Said personal visual element(s) is(are) printed on the electronic identity device 1 (particularly if the electronic identity device 1 is a chip card; see example in FIG. 2*a*), and/or displayed by the display means 13 (typically if the electronic identity device 1 is a smartphone; see the example in FIG. 2*b*). In the first case (visual elements printed on the electronic identity device 1), it is understood that the appearance thereof is therefore permanent over the lifespan of the device 1.

It should be noted that preferably the visual element(s) for which an item of reference information is contained in the dynamic verification code are arranged so as to be visible simultaneously, and at the same time as said dynamic verification code (for example on the same face, which is the case in the example of FIG. 2*a*), which enables the acquisition of a single image representing, at the same time, each personal visual element of the individual and the dynamic verification code, but it will be understood that it is possible that part of said visual elements are for example arranged on the reverse side of the card, which requires acquiring two images (front and reverse) so that all the visual elements are represented. In any case, at least one visual element and the dynamic verification code must be visible at the same time to avoid fraud, and in the following part of the description the preferred example of a one-sided chip card of the type shown in FIG. 2*a* will be used.

Figure 4:
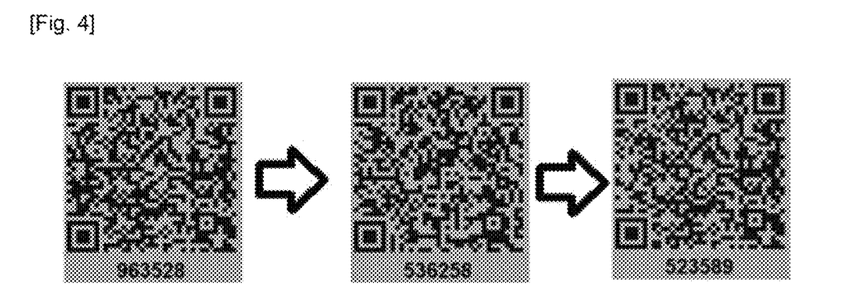
FIG. 4 Illustrates an example of development of dynamic verification code for the implementation of the method according to the invention.

The dynamic verification code is displayed necessarily on the display means 13, since it is dynamic. This means that it varies over time as represented, for example, in FIG. 4 (different algorithms will be shown below), and therefore changes appearance, although it always contains the reference information representative of an expected appearance of a visual element.

Representative information of an appearance of a visual element is understood as descriptive data of at least one fragment of said visual element as it appears, i.e. an "imprint," which will enable comparisons.

The information representative of the "theoretical" appearance of the visual element, i.e. as it is expected, is designated as "reference" information. On the other hand, the information representative of the appearance observed of the visual element, i.e. as represented in an acquired image, is designated as "candidate" information. It will be understood that this observed appearance is generally not perfectly identical to the expected appearance, due to the conditions of inherent defects in the image acquisition process, and to the variability of the conditions under which the shot is taken (lighting, movement, distance, etc.).

However, said information representative of the appearance is chosen in such a way that if two visual elements have matching appearances (i.e. it involves the same visual element even if the conditions under which the shot is taken are not identical), then the representative information thereof also matches (i.e. has a gap according to a given metric that is less than a threshold).

Therefore, the reference information and the candidate information match if and only if the observed appearance and the expected appearance of the visual element match, i.e. it is clearly the same visual element; in other words the visual element printed/displayed on the electronic identity device 1 has not been fraudulently altered. This verification can be done for each visual element for which representative information is contained in the dynamic verification code.

If the visual element is a graphical element such as a photograph, a signature, a biometric sample or a representation of an alphanumeric attribute, i.e. an image, the Digital Photo Seal can be used as representative information of the appearance of the graphical element, i.e. the security data as described in application EP3206192, based on the position of singular points of the graphical element. In the case of a biometric sample, it is possible to use a template of the biometric sample, i.e. the set of "features" of the biometric sample, for example the location and the orientation of minutiae for a fingerprint.

If the visual element has an alphanumeric attribute, the reference information representative of an expected appearance of said visual element can directly be the value of said alphanumeric attribute or a hash, i.e. a cryptographic imprint of said alphanumeric attribute by using any cryptographic hashing function.

To summarize, it is understood that the electronic identity device displays its own verification "key" (it does not require to be stored anywhere), and this is done dynamically, which invalidates the old copies of the device 1. More specifically, a generated code is only valid for a brief period of time, which enables the use thereof without difficulty for an authentication method as in the prior art, including on the basis of a copy, yet temporarily. Therefore, it is impossible for a third-party to subsequently misuse a copy: the dynamic verification code, although valid, will have expired.

The dynamic verification code is preferably displayed in the form of a QR code, or any other matrix code, as shown in the figures, due to the volume of data that it can contain and the robustness thereof. Nevertheless, any type of visual signal will be able to be displayed, including a watermark, and alphanumeric code, a flashing light, etc. Advantageously, the dynamic verification code can be displayed in a plurality of forms at a time, as shown in the figures (a QR code plus a six-figure code), i.e. a primary portion containing all the data to be transmitted (the QR code in the figures) and a secondary redundancy portion containing all or part of the data (the six-figure code), preferably in alphanumeric form in order to be readable on and entered into an interface. Said secondary portion has numerous uses. This allows the user to display the dynamic update of the verification code more easily, and can increase security (redundancy), and can also be used in additional authentications; see below.

It should be noted that chip cards with display of a dynamic verification code are presently known, particularly the CVV security code of bank cards; see for example application FR3038418. These are D-CVV. It will be understood that such codes are simply keys enabling a transaction; they are not intended to be represented in an image, and especially do not contain reference information representative of an expected appearance of a personal visual element visible on the card.

The use of electronic ink (e-ink) technology for the display means makes it possible to limit electrical consumption as much as possible (the display itself consumes no power; it is the change of state that consumes power), and to be compatible with a chip card type device 1.

It should be noted that if the data processing means 11 can access the data from the chip 10 (the chip 10 and the data processing means 11 are connected as in FIG. 3c), the dynamic verification code advantageously further comprises a signature of the reference information. Indeed, the chip 10 stores certificates that can be used for electronic signature. Bear in mind that a data electronic signature is typically an encryption of a hash of said data by means of a private key.

Generation of the Dynamic Verification Code

In a preferred embodiment, the method begins with a step (a) of display by the display means 13 of said electronic identity device 1 of said dynamic generation verification code, advantageously preceded by the generation of said dynamic verification code by data processing means 11 of said electronic identity device 1 based on at least the said reference information representative of an expected appearance of said visual element and a one-time password (OTP). It is this OTP that makes the dynamic character possible.

OTP is understood as being data valid for a single session (session being understood either as the use of the electronic identity device 1, i.e. an authentication, or for a time interval, for example 10 minutes). In a known way, the generation of the dynamic code typically implements a cryptographic function (for example by using a public key from the server 2) in which the OTP is used as the unknown value.

In this regard, each step (a) preferably comprises the generation of said OTP on the basis of a secret stored by the electronic identity device 1 (for example in the memory 12 thereof).

According to a first embodiment, the OTP is event-based. This means that an event is required to generate an OTP, for example the pressing of a button 14, if applicable. Numerous algorithms for generating such an OTP are known; for example, a cryptographic hashing function is applied recursively to an initial value, said value and/or a parameter of the function constituting the secret. Alternatively, the secret can directly be a list of pre-generated OTPs, the list being unstacked with each event. Again, alternatively, the OTP can be of an HOTP type, i.e. "HMAC-based," where an HMAC (hash-based message authentication code) is a type of message authentication code. The generation of an HOTP uses a counter, incremented with each use.

In such an embodiment, preferably the display means 13 are active only during a predetermined period of time after the generation of the dynamic verification code, for example 1 minute, in order to save battery power.

According to a second embodiment, the OTP is time-based. This is referred to as TOTP. Here, the generation of the OTP is also a function of time information, particularly provided by a timer used by the data processing means 11. Therefore, the generated dynamic verification code is valid for a predetermined period of time, for example, 30 seconds. Upon expiration of that period, a new TOTP and therefore a new verification code is generated, and so on. Numerous algorithms for generating a TOTP are known, such as, for example, an extension of the algorithm for generating HOTPs, in which the counter is replaced by the time information.

In this second embodiment, the display means 13 can permanently display the currently valid dynamic verification code (particularly if the means are e-ink and low-consumption), i.e. update the display upon expiration of each validity time interval, or activate the display, for example, only when the button 14 is pressed. It should be noted that the power consumption can be higher, but such a mode is particularly preferred since there is no risk of OTP "offset" which could occur if for example in the event-based embodiment the user inadvertently presses several times on the button 14: at a given moment, there is only one possible TOTP.

The generation itself of the dynamic verification code from the item(s) of reference information and from the OTP can be implemented in any known way, particularly by encrypting the information using the OTP as an unknown value.

It should be noted that the dynamic verification code can also contain one or more data representative of the OTP, i.e. either the OTP itself or verification data from the OTP, for example, a hash of the OTP and/or time information upon the generation of the OTP (particularly the date of generation, or the time information used for the generation in case of a TOTP), to prevent anyone from being able to access the reference information by deciphering the dynamic code. It should be noted that it is quite possible for the code to contain both the OTP itself and other representative data such as the generation date. As will be seen, this will particularly allow detecting cases in which the image of the electronic identity device is not fraudulent but simply expired. The dynamic verification code can contain, as appropriate, an electronic signature of the data representative of the OTP, to further ensure their authenticity. According to one embodiment, said information representative of the OTP constitutes the secondary portion of the OTP (six-figure alphanumeric code visible in the figures).

To summarize, the dynamic verification code can contain:
  the reference information representing the expected appearance of each of the visual elements;
  an electronic signature of said reference information;
  the OTP and/or other data representative of the OTP;
  an electronic signature of said data representative of the OTP.

At this stage, the electronic identity device 1 can be usable by the holder thereof at any time: it is sufficient, as has been explained, for him/her to acquire in one way or another (for example by the acquisition means 31 of the client 3) an image acquired from the electronic identity device 1, the image representing at least one personal visual element of the individual and a dynamic verification code that are visible on said electronic identification device 1. Preferably, said image represents the whole electronic identity device 1, at least a complete face. As explained, it may be necessary to acquire a plurality of images, for example to see all the faces.

Verification

The main part of the method according to the invention for authentication of an electronic identity device 1 presented by an individual as being his/her own will now be described, said individual providing for that purpose, in one way or another, an image acquired from said electronic identity device 1.

The objective is to verify that step (a) has gone well as described previously, and that there is no forgery (for example an image that had been fraudulently modified). Therefore, the entity whishing authentication (for example a bank) sends said image to the server 2.

In step (b), the data processing means 21 of the server 2 receive said image acquired from an electronic identity device 1 presented by said individual. As explained, the image represents at least one personal visual element of the individual and a dynamic verification code that are visible on said electronic identity device 1.

In step (c), the data processing means 21 of the server 2 analyze the image in order to extract:
  an item of candidate information representative of the appearance of said visual element as represented in the acquired image;
  the reference information representative of the expected appearance of said visual element contained in said dynamic verification code as represented in the acquired image (and, if applicable, the representative data of the OTP and/or the electronic signature).

The extraction of the candidate information comprises the identification of the visual element that appears in the image (again, a graphical element, an alphanumeric attribute, etc.), and the obtaining of the candidate information in the same way as the reference information was obtained from the expected visual element. The identification of the visual elements can be done using models or masks (indeed, the various visual elements and the dynamic verification code always appear at the same place on the surface of the electronic identity device 1), and therefore the analysis of the image can comprise the recognition of a contour of the electronic identity device 1, the cropping of said contour, and the application of predetermined masks. To do this, suitable convolutional neural networks can be artfully used.

Once the visual elements and the dynamic verification code have been "isolated" on the image, the same algorithms are applied as those ones that have been applied to the visual identity elements in order to obtain the candidate information representative of the appearance of said visual element as represented.

For example, if a visual element is a graphical element of image type, the information representative of the appearance of said visual element can be Digital Photo Seal type security data. Similarly, if a visual element is an alphanumeric attribute, optical character recognition can be used to read said alphanumeric attribute. If a visual element is a biometric sample, an algorithm for extracting the template of the biometric sample (i.e. extracting the features) from the image (minutiae detection for instance) could be performed.

It is understood that the reference and candidate information must be obtained in an identical way in order to be able to be compared.

With respect to the reference information representative of the expected appearance of said visual element contained in said dynamic verification code, as represented in the acquired image, the dynamic verification code must be read (which is easy if for example it is in the form of a QR code), and deciphered.

This requires knowledge of the OTP. In any case, step (c) also comprises the generation of said OTP at the server 2 in a way identical to the generation that took place at the electronic identity device 1, so as either to verify an OTP contained in the dynamic code read, or to decipher said dynamic code.

In other words, step (a) and step (c) each comprise the generation of said OTP, respectively by the data processing means 11 of the electronic identity device 1 and the data processing means 21 of the server 2, based on a shared secret; Thus, it will be understood that upon creation of the electronic identity device 1 (generally by a government entity), the same secret is generated and loaded into the memory 12 of the electronic identity device 1 and the memory 22 of the server 2, associated in particular with an identifier of the electronic identity device 1.

If the OTP is a TOTP, time information is also taken into account at the server 2. Naturally, it is understood that it cannot be exactly the same as during the implementation of step (a), since several seconds are required for acquiring the image, transferring it through the network 20 and processing it, but insofar as the TOTP is generated by time interval, the same TOTP will remain generated at the server 2.

In step (d), the data processing means 21 of the server 2 verify that the candidate information and reference information match.

The term "match" generally means that the result of a comparison of the candidate information and the reference information should show that they are identical, or at least have a gap of less than a predetermined error threshold. This depends on the type of visual element used. For example, for graphical elements, Digital Photo Seal security data match if they differ by less than 10%. Regarding alphanumeric attributes, they must be identical.

If the device 1 or the acquired image representing it has been altered (for example by replacing the photograph), then the respective candidate and reference information do not match (at least for a visual element), and the authentication will be rejected. A fraudulent use alert can be issued.

Preferably, if the OTP or data representative of the OTP are contained in the dynamic verification code, step (d) comprises the comparison of said OTP or data representative of the OTP obtained with the OTP generated by the data processing means 21 of the server 2. For example, if the data representative of the OTP obtained is a hash, then the data processing means 21 of the server 2 calculate the hash of the generated OTP and verify that they are identical. Otherwise, the OTP used to generate the dynamic verification code represented in the acquired image is expired. It should be noted that this does not necessarily mean fraudulent use, but presumably that the copy is too old. The individual can simply be requested to renew his/her attempt at authentication with a more recent OTP.

Preferably, if the dynamic verification code contains a signature, step (d) also comprises the verification of said signature, typically by deciphering it (it is an encryption of a hash of the reference information) with a public key, enabling the authenticity of the information contained in the dynamic verification code to be guaranteed. If this is not the case, the generation of a false dynamic verification code has been attempted (on the basis of "counterfeit" expected visual elements), and thus an alert for fraudulent use can be issued.

Otherwise, if:
Each item of reference information obtained matches the respective candidate information;
Each descriptive datum of the OTP obtained matches the generated OTP;
Each electronic signature is valid;
Then the authentication is confirmed.

It should be noted that for additional authentications (once a first authentication according to the present method has been completed), simplified authentications can be implemented based on the electronic identity device 1, particularly in a context of enhanced authentication (for example, the first complete authentication is required to open a bank account, and then the simplified authentication is used in addition as a login/password mechanism for online access to the accounts).

"Simplified" is understood as meaning the acquisition of an image is no longer necessary; for example, it is sufficient to enter the secondary part of the dynamic verification code (i.e. the six-figure alphanumeric code, see below).

A complete authentication can be required again at the end of a certain period of time, for example one year.

Equipment

According to a second and a third aspect, the authentication server 2 and the electronic identity device 1 are proposed for the implementation of the method according to the first aspect, i.e. the authentication of the electronic identity device 1.

The server 2 is typically connected to a network 20, and comprises data processing means 21 configured for:
Receiving an acquired image of an electronic identity device 1, the image representing at least one personal visual element of the individual and a dynamic verification code that are visible on said electronic identity device 1, said dynamic verification code containing at least one item of reference information representative of an expected appearance of said visual element;
Extracting, by analysis of the acquired image:
an item of candidate information representative of the appearance of said visual element as represented in the acquired image;
the item(s) of reference information representative of the expected appearance of said visual element(s) contained in said dynamic verification code as represented in the acquired image (and, if applicable, at least one datum representative of an OTP and/or an electronic signature);
Verifying that the candidate information and the extracted reference information match, advantageously after having generated an OTP, and if applicable verifying that said OTP matches the representative datum or data of an extracted OTP, and/or verifying the extracted electronic signature.

The electronic identity device 1 of an individual, as explained, is a chip card or a smartphone type terminal on which at least one personal visual element of said individual is visible (preferably printed if it is a chip card).

It comprises data processing means 11, a memory 12, display means 13, and optionally a button 14 and/or a battery.

The data processing means 11 are configured to:
Advantageously generate a one-time password, OTP, based on a secret preferably shared with the server 2;
Generate and display on the display means 13 a dynamic verification code containing at least one item of reference information representative of an expected appearance of said visual element (and, if applicable, at least one datum representative of an OTP and/or an electronic signature), said dynamic verification code preferably being generated based on at least said item of reference information representative of an expected appearance of said visual element and of said generated OTP.

According to a fourth aspect, the authentication system is proposed comprising an authentication server 2 according to the second aspect and at least one electronic identity device 1 (in particular one for each individual) according to the third aspect.

The system can further comprise at least one client equipment 3 (typically connected to the server 2 via the network 20, directly or indirectly) comprising optical acquisition means 31 for the acquisition of said image representing at least the personal visual element of the individual and the dynamic verification code that are visible on said electronic identity device 1.

Computer Program Product

According to a fifth and a sixth aspects, the invention relates to a computer program product comprising code instructions for the execution (in particular on the data processing means 11, 21 of the electronic identity device 1 and/or of the server 2) of a method according to the first aspect of the invention for authentication of an electronic identity device 1, as well as storage means readable by computer equipment (a memory 12, 22 of the equipment 1, 2) on which said computer program product is located.

The invention claimed is:
1. A method of authentication of an electronic identity device presented by an individual, the method being characterized in that it comprises the implementation of steps of:
(b) reception by a data processor of a server, of an acquired image of said electronic identity device, the image representing at least one personal visual element of the individual and a dynamic verification code that are visible on said electronic identity device, said dynamic verification code containing at least one item of reference information representative of an expected appearance of said visual element, said visual element visible on said electronic identity device being a graphic element, in particular a photograph or a handwritten signature of the individual, the reference information representative of an expected appearance of said graphic element being Digital Photo Seal type security data;

(c) extraction by analysis of said acquired image by the data processor of the server of:

an item of candidate information representative of the appearance of said visual element as represented in the acquired image;

the reference information representative of the expected appearance of said visual element contained in said dynamic verification code as represented in the acquired image;

(d) verification by the data processor of the server that the extracted item of candidate information and reference information match.

2. The method according to claim 1, comprising a step (a) of displaying by display means said dynamic verification code from said electronic identity device.

3. The method according to claim 2, wherein the step (a) comprises the preliminary generation of said dynamic verification code by a data processor of said electronic identity device based on at least said reference information representative of an expected appearance of said visual element and a one-time password (OTP).

4. The method according to claim 3, wherein the step (a) and the step (c) each comprise the generation of said OTP, respectively by the data processor of the electronic identity device and the data processor of the server based on a shared secret.

5. The method according to claim 4, wherein said one-time password is a time-based one-time password, TOTP, the generation of said TOTP by the data processing means of the electronic identity device and the data processor of the server also being based on time information.

6. The method according to claim 3, wherein said dynamic verification code also contains at least one descriptive data from said OTP generated by the data processor of the electronic identity device, step (c) also comprising the extraction of the descriptive data from said OTP contained in said dynamic verification code as represented in the acquired image, step (d) also comprising the verification that the OTP generated by the data processor of the server matches said descriptive data of the extracted OTP.

7. The method according to claim 2, wherein said dynamic verification code is displayed in the form of a QR code and/or an alphanumeric code.

8. The method according to claim 1, wherein said dynamic verification code also contains an electronic signature of said reference information representative of an expected appearance of said visual element, step (c) also comprising the extraction of the electronic signature contained in said dynamic verification code as represented in the acquired image, step (d) also comprising the verification that said extracted electronic signature is valid.

9. The method according to claim 1, wherein said personal visual element of the individual is printed on the electronic identity device.

10. An authentication server, comprising a data processor configured for:

receiving an acquired image of an electronic identity device presented by an individual, the image representing at least one personal visual element of the individual and a dynamic verification code that are visible on said electronic identity device, said dynamic verification code containing at least one item of reference information representative of an expected appearance of said visual element, said visual element visible on said electronic identity device being a graphic element, in particular a photograph or a handwritten signature of the individual, the reference information representative of an expected appearance of said graphic element being Digital Photo Seal type security data;

extracting, by analysis of said acquired image:

an item of candidate information representative of the appearance of said visual element as represented in the acquired image;

the reference information representative of the expected appearance of said visual element contained in said dynamic verification code as represented in the acquired image;

verifying that the extracted candidate information and reference information match.

11. An electronic identity device of an individual, the electronic identity device configured to:

display at least one personal visual element of said individual on said electronic identity device, said visual element being a graphic element that is a photograph or a handwritten signature of the individual, generate and display a dynamic verification code containing at least one item of reference information representative of an expected appearance of said visual element, the reference information representative of an expected appearance of said graphic element being Digital Photo Seal type security data.

12. The device according to claim 11, including a data processor configured for preliminarily generating a one-time password (OTP), said dynamic verification code being generated based on at least said reference information representative of an expected appearance of said visual element and of said generated OTP.

13. An authentication system comprising:

an authentication server according to claim 10;

at least one electronic identity device of an individual on which at least one personal visual element of said individual is visible, said visual element visible on said electronic identity device being a graphic element, in particular a photograph or a handwritten signature of the individual, characterized in that it comprises a data processor configured for generating and displaying on display means a dynamic verification code containing at least one item of reference information representative of an expected appearance of said visual element, the reference information representative of an expected appearance of said graphic element being Digital Photo Seal type security data; and and at least one client equipment comprising a scanner or camera for the acquisition of said image representing at least the personal visual element of the individual and the dynamic verification code that are visible on said electronic identity device.

14. A non-transitory computer program product comprising code instructions for the execution of a method according to claim 1 of authenticating an electronic identity device presented by an individual, when said method is executed on a computer.

15. A non-transitory storage means readable by a computer equipment on which a computer program product comprises code instructions for the execution of a method according to claim 1 of authenticating an electronic identity device presented by an individual.

\* \* \* \* \*